(12) United States Patent
Call et al.

(10) Patent No.: US 7,694,803 B1
(45) Date of Patent: Apr. 13, 2010

(54) BRAKING CONVEYOR SYSTEM

(75) Inventors: Richard C. Call, Franklin, TN (US); Randy J. Kinsey, Columbia, TN (US); Wayne T. Cope, Thompson Station, TN (US); Edward Mucha, Jr., Lewisburg, TN (US); Glenn Terryah, Holly, MI (US); James R. Heavener, Almo, KY (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/362,388

(22) Filed: Jan. 29, 2009

(51) Int. Cl.
*B65G 17/32* (2006.01)

(52) U.S. Cl. .................. 198/680; 198/678.1; 198/465.4; 104/172.5

(58) Field of Classification Search .............. 198/465.4, 198/678.1, 680, 681, 683, 684, 685, 687; 104/93, 162, 172.4, 172.5, 197, 229, 231; 118/324
See application file for complete search history.

(56) References Cited

U.S. PATENT DOCUMENTS

| | | | | |
|---|---|---|---|---|
| 3,637,067 A | * | 1/1972 | Wright | 198/685 |
| 5,609,239 A | * | 3/1997 | Schlecker | 198/680 |
| 5,649,618 A | * | 7/1997 | Tetzloff | 198/687.1 |
| 6,431,347 B1 | * | 8/2002 | Gossner | 198/687.1 |
| 6,554,127 B1 | * | 4/2003 | Kroll | 198/465.4 |
| 7,377,377 B2 | * | 5/2008 | Christiansson | 198/465.4 |

* cited by examiner

*Primary Examiner*—James R Bidwell (57) ABSTRACT

An assembly and method for controlling movement of a chain section during removal, including a mounting body providing a connector adapted for connection to a chain, a pair of rollers secured to the mounting body, the rollers being adapted for rotational movement along the channeled track, and an engaging member positioned between each roller and said mounting body, wherein the engaging member is configured to extend the roller between a disengaged and engaged positions, so that movement of the chain is retarded as the roller extends towards the engaged position.

8 Claims, 6 Drawing Sheets

BRAKING CONVEYOR SYSTEM

FIELD OF THE INVENTION

This invention relates generally to a conveyor system adapted for carrying a load along a path and more specifically, the present invention relates to an improved chain and trolley conveying system adapted for retarding movement of the chain along the conveyor system.

BACKGROUND OF THE INVENTION

Typical industrial conveying systems are used to move items from one location inside a structure to another. Often these systems move items along a path having vertical ascending and descending contours while traveling horizontally along the structure. These conveyor systems typically utilize heavy-duty rollers which roll along a trolley track by a conveying means, usually an endless chain. In industrial systems, these chain trolleys and associated chains, can have a significant mass, be difficult to handle and hard to reach. Over time, problems may arise in industrial conveyor systems, for example, when a conveyor chain is damaged or broken or when a conveyor line becomes obsolete or must be removed or modified during change-out of the equipment. Removing the chain, or a portion thereof, from an industrial conveyor system can be problematic.

By way of example, and not as a limitation, in some industrial processes the chain can extend substantial lengths and the weight can be significant. In addition, access to the chain can be problematic because the travel path may have multiple turns, inclines and declines or the path may be obstructed by nearby objects. Generally, to remove a chain or portion thereof, a break in the track must provide access to the chain and a portion of the chain must be decoupled or removed. Once the chain has been decoupled, it may travel out of the break and be removed from the conveying system. In some cases, when inserting a new chain, the new chain may be attached to an existing chain and threaded through the system by the existing chain. In this way, the new chain may act as a counter balance to help maintain the elongated nature of the chain. However, when removing a portion of the existing chain without adding a new chain, the decoupled chain may runaway and become entangled within the conveying system. While ropes may be tied around the chain trolley to assist in preventing runaway chains, portions of the chain may not be accessible throughout the facility or the ropes may become entangled by nearby objects and may require excessive effort to prevent movement of the conveying system chain.

Therefore it would be beneficial to provide a system and method for retarding movement of the conveying system during removal of a chain or a portion thereof, preventing the chain from running away during the chain removal process.

SUMMARY OF THE INVENTION

The present invention reduces the difficulties and disadvantages of the prior art by providing a system and method for removing a chain from a conveying system using a chain trolley assembly adapted for retarding movement along a channeled track having an interior surface, said chain trolley assembly comprising a mounting body providing a connector adapted for connection to a chain, a pair of rollers secured to and extending outwardly from said mounting body said rollers being adapted for rotational movement along the channeled track and an engaging member positioned between each roller and said mounting body, said engaging member adapted for extending said roller between a disengaged position and an engaged position whereby movement of said chain is retarded as said roller extends towards said engaged position. In addition, the present invention provides a method for removing a section of chain from a conveyor system having a channeled track, the method including the steps of providing a plurality of chain trolleys each having an engaging member extending between a pair of rollers and a mounting body, said engaging member adapted for positioning said rollers between a disengaged position and an engaged position whereby said rollers are associated with said channeled track in the engaged position, associating said chain trolleys along the section of chain and orientating said rollers in the engaged position, decoupling said chain at a location spaced from said chain trolleys and removing said chain from said track, whereby movement of the chain associated with said chain trolleys is retarded along said track.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
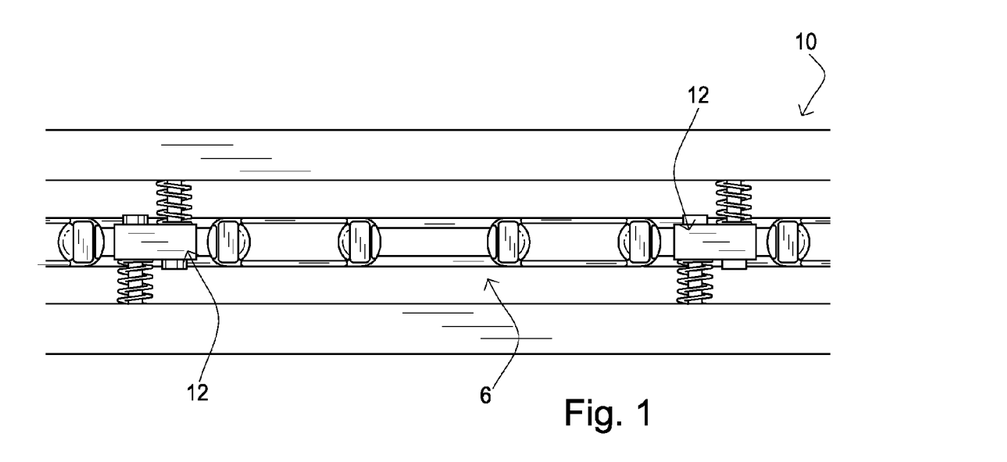
FIG. 1 is a bottom perspective view of the conveying system in accordance with the present invention.

In general, the present invention relates to a conveying system having a retarding or braking chain trolley adapted for limiting movement of a chain such as an inverted conveyor chain or overhead conveyor chain during its removal from the conveyor system, generally referred to herein by reference numeral 10. Illustrated in FIG. 1, is an embodiment of the conveyor system 10, which comprises two parallel power rails adapted for receiving plural braking chain trolleys 12 spaced along a chain 6.

Figure 2:
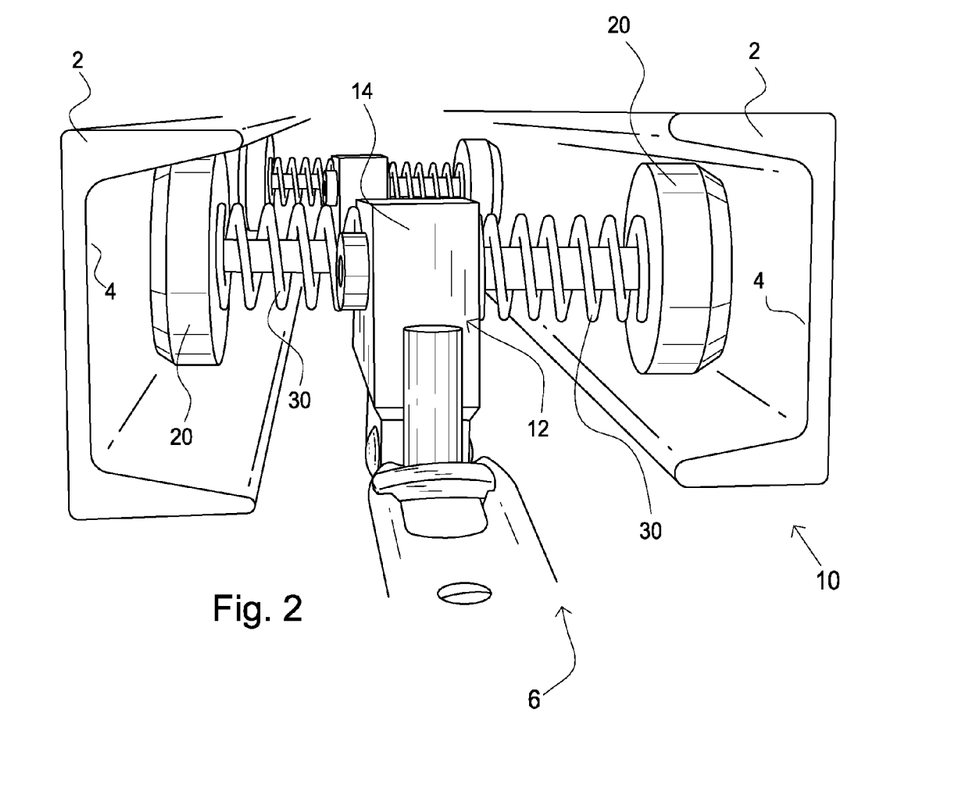
FIG. 2 is a rear perspective view of the conveying system according to FIG. 1.

As illustrated in FIG. 2, the conveyor system 10 is comprised of a track 2 with inwardly facing C-channels adapted for receipt of the braking chain trolleys 12 which are moved along the track 2 by the chain 6. The C-channeled track 2 represents an I-beam section, and each of the braking chain trolleys 12 consist of a mounting body 14 extending vertically between an upper and lower region 14a, 14b and horizontally between a pair of rollers 20 secured to and extending outwardly from the mounting body 14.

Generally, the rollers 20 are adapted for rotational movement along the track 2. The shape of the rollers 20 is determined in part by the track 2, the rollers 20 being generally adapted for frictional engagement with the interior track surface 4. The rollers 20 may be round, regular or irregularly shaped depending on the chain removal application. In some situations, it may be desirable to provide a greater coefficient of friction which will be affected by the shape of the rollers 20. In addition, it may be necessary to make the rollers 20 wider or narrower or taller or shorter depending on the spacing and configuration of the tracks 2 with respect to the braking chain trolley 12. Additionally, some portions of the rollers 20 may be removed or increased to balance the rollers 20 or reduce the mass of the rollers 20 or the rollers 20 may be configured for varying the coefficient of friction, weight, the strength or durability. For example, and not as a limitation, the rollers may be rounded disks fabricated from plastic or metal such as copper or aluminum. The rollers 20 may include tapered edges to help the braking chain trolley 12 pass over irregular surfaces such as welded joints and expansion joints within the conveyor system 10.

Figure 8:
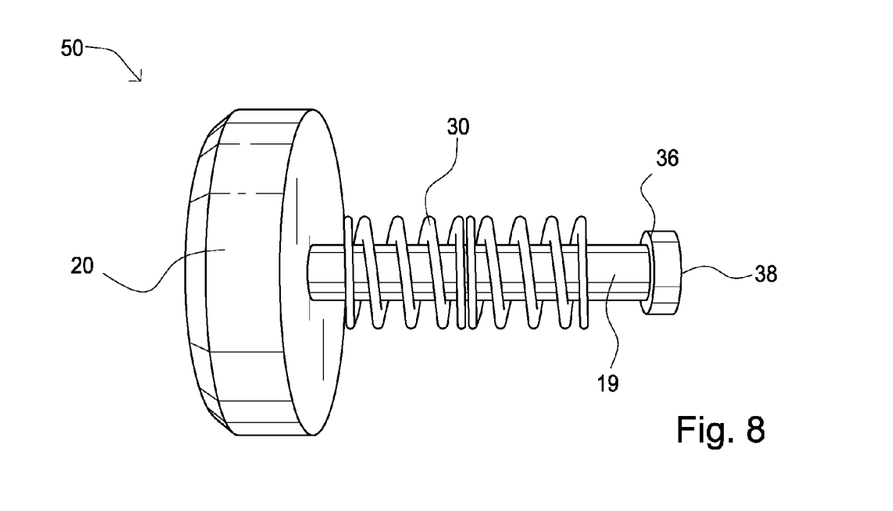
FIG. 8 is a front perspective view of a roller assembly in accordance with an embodiment of the present invention.
Figure 9:
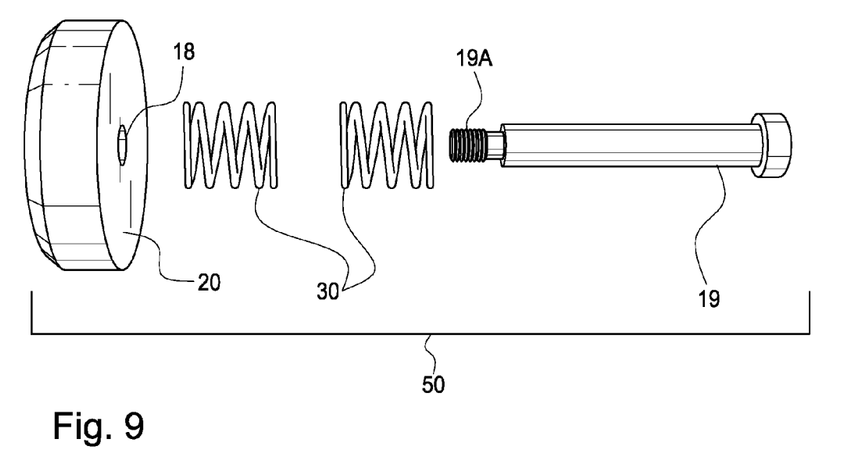
FIG. 9 is an exploded perspective view of the roller assembly according to FIG. 8.

An engaging member 30, illustrated in FIGS. 2, 8-9 is generally positioned between the roller 20 and the mounting body 14, is adapted for compression. In some cases, the compression may provide around a half of an inch of compression between the pair of rollers 20 to allow movement over irregular surfaces. While under compression, the engaging member 30 is disengaged from the interior track surface 4 whereby the rollers 20 may substantially rotate. While compressed, the chain trolley 12 is orientated towards the retracted position. However, the engaging member 30 may engage the interior track surface 4, while at least partially uncompressed, allowing for frictional rotation of the rollers 20 along the track surface 2 and presenting an extended position.

The pair of engaging members 30 illustrated in FIGS. 2, 4-6 extends from the mounting body 14 towards the rollers 20, the engaging members 30 being generally compressible steel coils, having a bias for extending the rollers 20 outwardly, providing a frictional engagement between the chain trolley 12 and the track 2. Alternatively, the rotational movement of the rollers 20 along the track 2 could be mechanically or otherwise limited with a braking mechanism for the braking chain trolley 12 to limit or retard movement of the chain 6 along the track 2.

Figure 3:
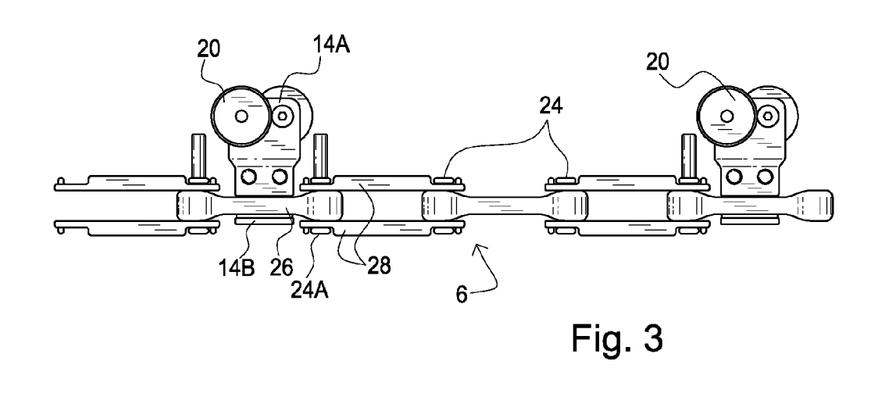
FIG. 3 is a side elevation view of a braking section in accordance with the present invention.

As illustrated in FIG. 3, the chain 6 is composed of alternative center links 26 and pairs of side bars 28 connected together by a plurality of pins 24. The upwardly extending pin 24, is illustrated in FIGS. 2-3 extending through the chain 6, the pin 24a extending vertically through the chain 6, generally securing the braking chain trolley 12 to the chain 6. The side profile of the braking chain trolley 12 is also depicted with the upper region 14a being generally associated with the rollers 20 and the lower region 14b being generally associated with the center link 26. The lower region 14b is configured so that it is generally planar with the adjacent sidebars 28, thereby limiting jamming of the chain 6 through the conveyor system 10. The lower region also includes a right and left leg 32, 34, extending downwardly from the mounting body 14. Generally, the legs 32, 34 are adapted for supporting the mounting body 14 above the center link 26, and are illustrated as being secured to the mounting body 14 with mechanical fasteners like rivets such that the braking chain trolley 12 is secured to the chain 6 for movement along the track 2.

The rollers 20, illustrated in FIG. 3, are generally secured to the mounting body 14, with for example, rotational members 19 received by apertured receivers 18 which may be threaded, associated with the rollers 20 and a rotational member such as a shoulder bolt or bearing associated with the mounting body 14, although other known fasteners and rotational members are known and may be utilized.

Figure 4:
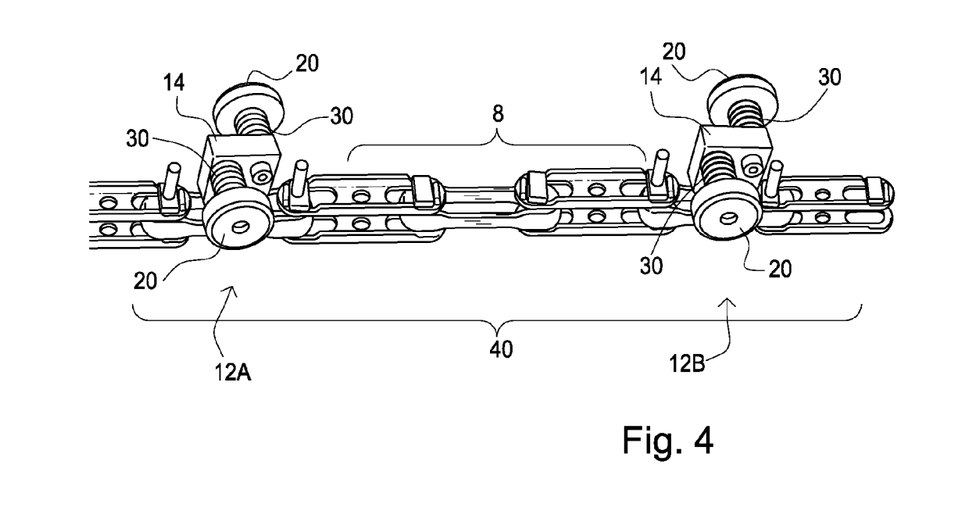
FIG. 4 is a top perspective view of the braking section in accordance with FIG. 3.

Alternatively, plural braking chain trolleys 12 may be arranged in a braking chain section 40 which may be easily connected to and separated from an existing chain 6, with plural braking chain trolleys 12 being spaced along a brake chain 8 as illustrated in FIG. 4. Generally, the brake chain may be any compatible chain section, including a section of the chain 6 and may have any length, but in practice it may be beneficial to provide a two-foot or longer section. The braking chain section 40 may be placed on a trailing end of the removed chain 6 with the pin, providing tension and preventing the chain 6 from becoming entangled or jammed within the conveyor system 10. Generally, the braking chain section 40 provides a drag or frictional material for engagement along the track 2, the braking chain section being associated with the trailing end of the chain 6, and generally adapted for limiting the movement of the attached chain 6.

In operation, the braking chain section 40 is connected to the nearby chain 6 with chain pin 26, the chain 6 being associated with the channeled track 2. The braking chain section 40 generally includes a first and a second braking chain trolleys 12a, 12b adapted for connection to the brake chain 8, the brake chain 8 being connectable to the chain 6. The first chain trolley 12a is generally associated with the second chain trolley 12b along the brake chain 8. Each chain trolley 12 is provided with a connector adapted for connection to the brake chain 8 and a pair of rollers 20 secured to and extending outwardly from the mounting body 14 and adapted for rotational movement along the channeled track 2. The engaging member 30, associated with the rollers 20, positions the rollers 20 between an engaged position and a disengaged position, where the movement of the chain 6 is limited as the roller 20 extends towards the channel track 2 in the engaged position. In the engaged position, the rollers 20 generally provide outward force against the track 2.

Figure 5:
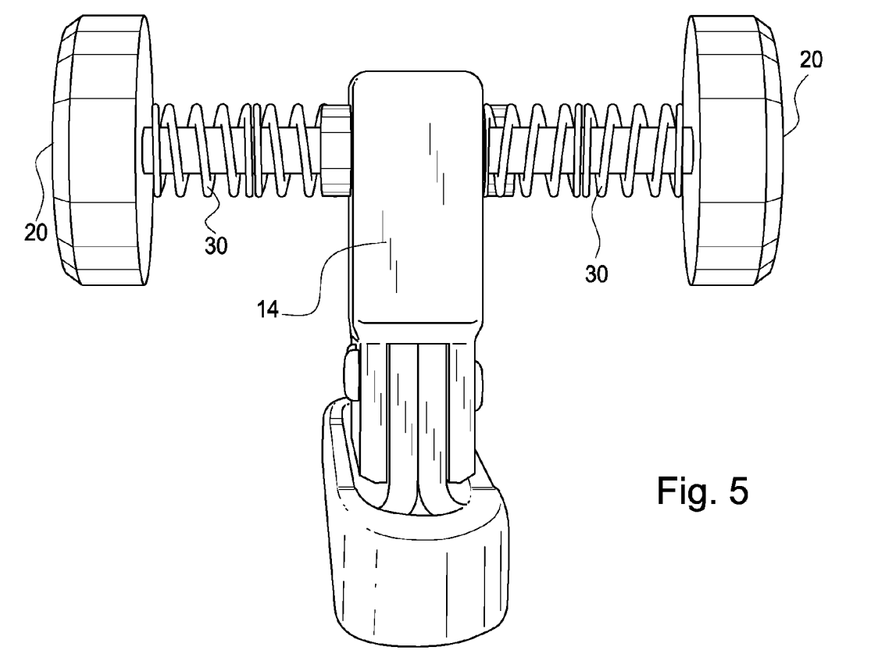
FIG. 5 is a rear elevation view of the chain trolley in accordance with the present invention.
Figure 6:
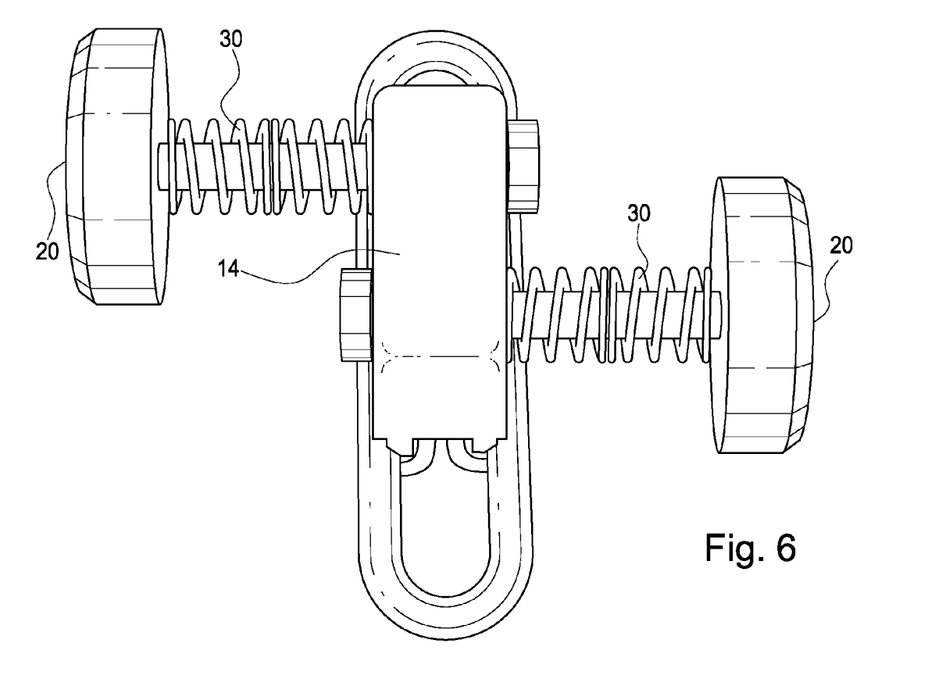
FIG. 6 is a top perspective view of the chain trolley according to FIG. 5.
Figure 7:
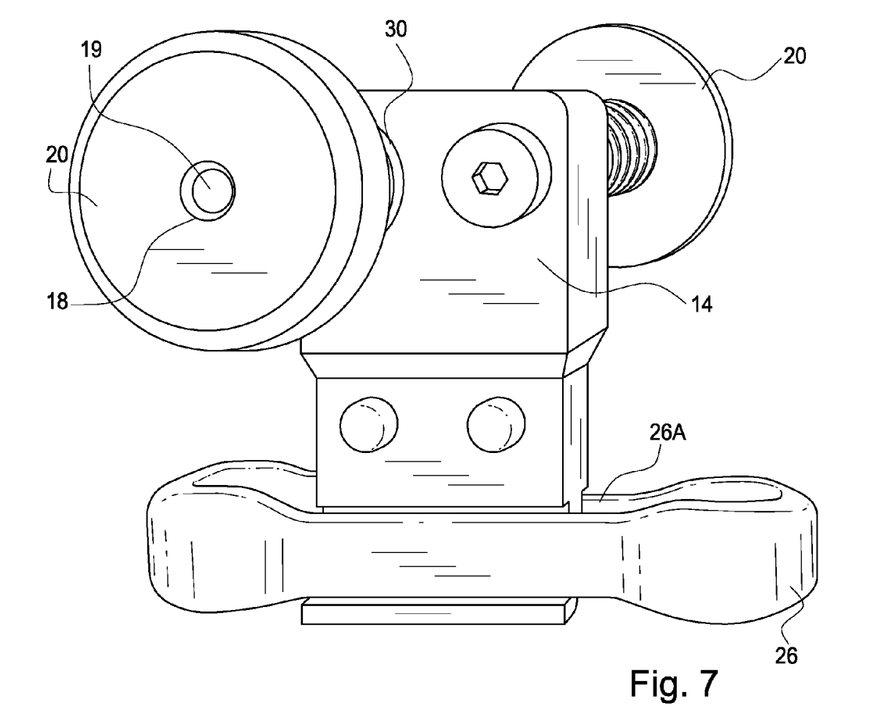
FIG. 7 is a side perspective view of the chain trolley according to FIG. 5.

FIGS. 5-7 illustrate an embodiment of the braking chain trolley 12, including the mounting block 14 with a plurality of apertured receivers 18 which align with the rotational members 19 associated with the engaging members 30. The rotational members 19 may include a number of machine screws or other suitable fasteners which may be received by the mounting block 14. The rotational members 19 are generally configured to secure the rollers 20 to the mounting block 14 during travel of the braking chain trolley 12 along the conveyor system 10.

As illustrated in FIG. 7, the mounting block 14 extends from and is generally fastened to the underlying bossed center link 26a, with a mechanical fastener or other suitable means, such as welding the mounting block 14 to the center link 26. The shape of the mounting block 14 is determined in part by the space between the tracks 2, the engaging members 30 and the braking chain trolley 12. It may be necessary to make the mounting block 14 taller or shorter to align the rollers 20 with the tracks 2, while aligning the connected bossed center link 26a with the nearby chain 6. In addition, it may be necessary to make the mounting block 14 wider or narrower depending on the spacing of the tracks 2 with respect to the engaging members 30. Additionally, some portions of the mounting block 14 may be removed to reduce the mass of the mounting block 14 or the mounting block 14 may be configured from varying materials to allow for varying weight, additional strength or varying durability. Generally, the mounting block 14 is adapted for secure attachment to the nearby chain 6 while providing support for the horizontally configured engaging members 30. Although the engaging members 30 may be angularly orientated with respect to the mounting block 14, they are illustrated horizontally configured with the rollers 20 extending outwardly therefrom towards the track 2.

A roller assembly 50 illustrated in FIGS. 8-9 includes the roller 50 associated with the apertured receiver 18 and separated from the rotational member 19 by at least one engaging member 30. The roller 20 is generally depicted with a generally circular body including a circumferential surface for frictional rotational engagement with the channeled track 2. The apertured receiver 18 is depicted in receipt of the rotational member 19 in FIG. 8 with the free end extending outwardly therefrom with a shoulder 36 and head 38 adapted for rotational connection to the mounting body 14; the shoulder 36 providing for rotational movement of the roller 20 operably connected to the rotational members 19. As further illustrated in FIG. 9, the rotational member may be mechanically secured to the apertured receiver 18 associated with the roller 20 with for example mechanical threads 19a.

In addition, the invention includes a method for removing a section of the chain 6 from an existing conveyor system 10 having a track 2 by providing plural braking chain trolleys 12, each trolley 12 with engaging members 30 extending between the rollers 20 and the mounting body 14. The engaging members 30, illustrated in FIGS. 8-9 as spring coils, general position the rollers 20 between the disengaged position and the engaged position where the rollers 20 are generally associated with the channeled track 2. The braking chain trolleys 12 are associated with a distal end of the section of chain 6, the rollers 20 being orientated in the engaged position. Once the chain 6 is decoupled at the proximate end of the section of chain 6, removal of the chain 6 from the track may be retarded or controlled with the braking chain trolley 12 engaging the track 2. Depending on the amount of chain 6 to be removed from the conveyor system 10, two or more braking chain trolleys 12 may be desired.

Figure 10:
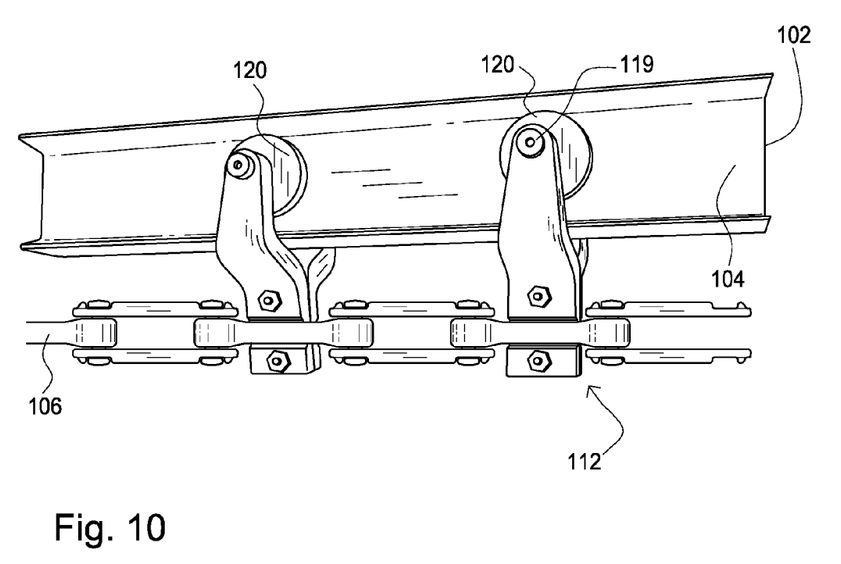
FIG. 10 is a side perspective view of an alternative conveying system in accordance with an alternative embodiment of the present invention.
Figure 11:
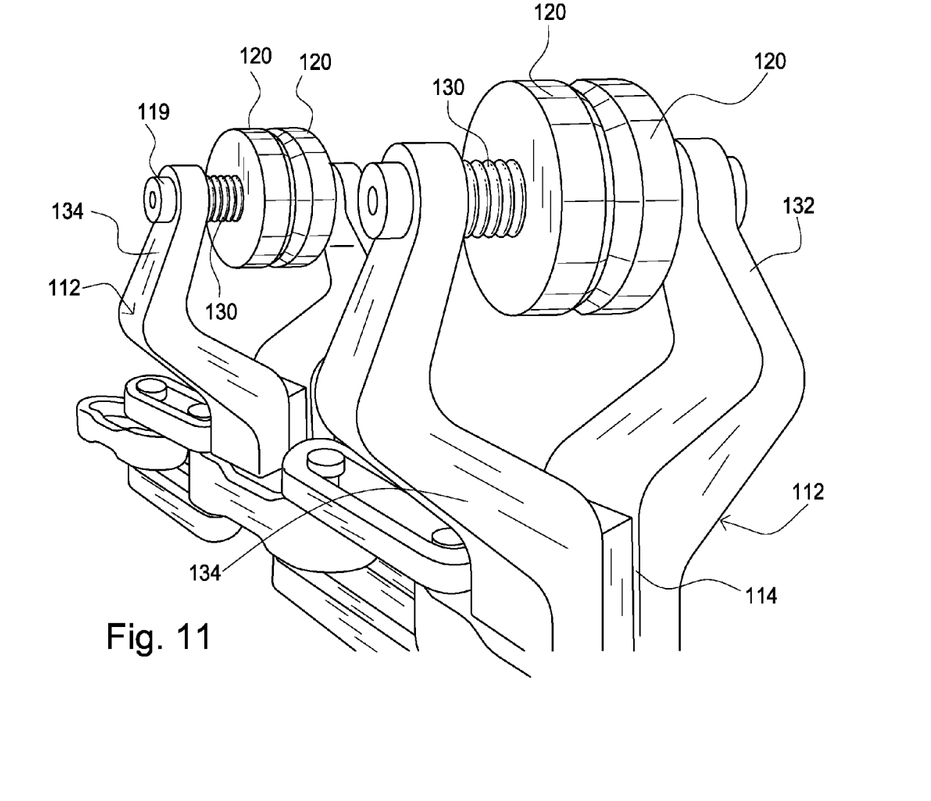
FIG. 11 is a front perspective view of the alternative conveying system according to FIG. 10.
Figure 12:
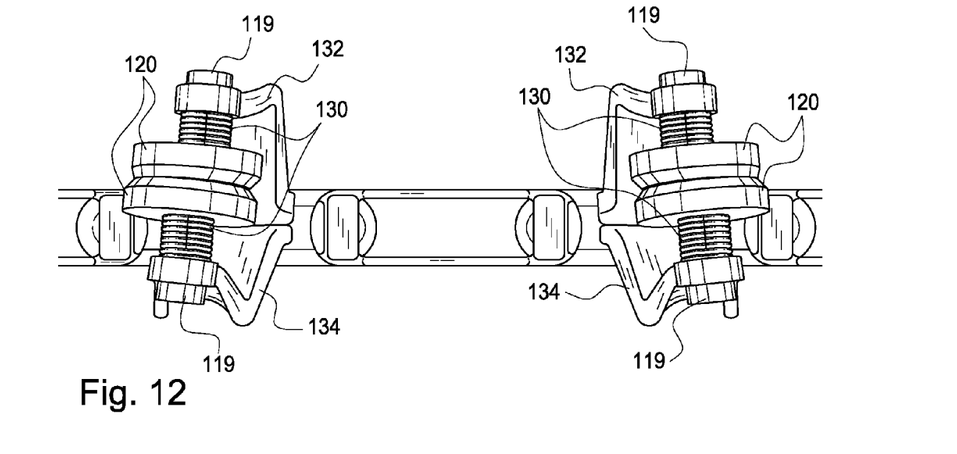
FIG. 12 is a top plan view of a braking section in accordance with FIG. 10.

In an alternative embodiment, the present invention may be utilized with an overhead conveying system with an overhead track 102 having two outwardly facing C-channels presenting an alternative interior track surface 104 adapted for receipt of the alternative braking chain trolley 112 which are moved along the overhead track 102 by the an overhead chain 106. The overhead track 102 represents an I-beam with two back-to-back C-channels. Each of the alternative braking chain trolleys 112 are illustrated in FIG. 11 with an alternative mounting body 114 having a first and second arm 132, 134 extending vertically and generally adapted for receiving the pair of centrally disposed alternative rollers 120. In FIGS. 11-12, the alternative engaging members 130 extend from each of the first and second arms 132, 134 towards the alternative roller 120 for frictional engagement between the rollers 120 and the overhead channeled track 102. The rollers 120 are generally rotationally secured to the arms 132, 134 with an alternative rotational member 119 as illustrated in FIG. 10-12.

While the invention has been described with respect to numerous characteristics of the invention, it will be appreciated that various changes can be made therein without departing from the invention. The present characteristics are, therefore, to be considered in all respects as illustrative and not restrictive, the scope of the invention being indicated by the claims rather than by the foregoing description, and all changes which come within the meaning and range of equivalency of the claims are therefore intended to be embraced within.

Having thus described the invention, what is claimed as new and desired to be secured by Letters Patent is as follows:

1. A chain trolley assembly adapted for retarding movement along a channeled track having an interior surface, said chain trolley assembly comprising:

a mounting body providing a connector adapted for connection to a chain, a pair of rollers secured to and extending outwardly from said mounting body, said rollers being adapted for rotational movement along the channeled track, and an engaging member positioned between each roller and said mounting body, said engaging member adapted for extending said roller between a disengaged position and an engaged position whereby movement of said chain is retarded as said roller extends towards said engaged position.

2. The chain trolley assembly of claim 1 wherein said engaging member is a die spring.

3. The chain trolley assembly of claim 1 wherein said rollers have tapered edges adapted for movement along uneven surfaces.

4. The chain trolley assembly of claim 1 wherein said mounting body further comprises apertured receivers adapted to receive rotational members extending from said mounting body towards said rollers through said engaging members.

5. The chain trolley assembly of claim 4 wherein said engaging members are biased from the disengaged position with said engaging members being generally retracted towards the engaged position with said engaging members being generally extended.

6. A braking section assembly adapted for connection to a chain associated with a channeled track, said braking section assembly comprising a first and a second chain trolley adapted for connection between the chain and a brake chain, said first chain trolley in communication with said second chain trolley along said brake chain, each of said first and second chain trolley including a mounting body providing a connector adapted for connection to the chain, a pair of rollers secured to and extending outwardly from said mounting body, each roller being adapted for rotational movement along the channeled track and an engaging member associated with said roller and adapted for positioning said roller between a disengaged position and an engaged position, whereby movement of said chain is retarded as said roller extends towards said engaged position.

7. The braking section assembly according to claim 6 further comprising a chain pin adapted for reattaching the braking section assembly to the chain.

8. A method for removing a section of chain from a conveyor system having a channeled track, said method including the steps of:

providing a plurality of chain trolleys each having an engaging member extending between a pair of rollers and a mounting body, said engaging member adapted for positioning said rollers between a disengaged position and an engaged position whereby said rollers are associated with said channeled track in the engaged position,
associating said chain trolleys along the section of chain and orienting the rollers in the engaged position,
decoupling said chain at a location spaced from said chain trolleys, and
removing said chain from said track, whereby movement of the chain associated with said chain trolleys is retarded along the track.

* * * * *